(12) United States Patent
Tillman et al.

(10) Patent No.: US 7,188,997 B2
(45) Date of Patent: Mar. 13, 2007

(54) APPARATUS AND METHOD FOR DETECTING HOT SPOTS IN AN ELECTRIC POWER CONDUCTOR

(75) Inventors: John M. Tillman, Hendersonville, NC (US); Lawrence B. Farr, Asheville, NC (US); Robert Yanniello, Asheville, NC (US); Cathleen M. Clausen, Arden, NC (US)

(73) Assignee: Eaton Corporation, Cleveland, OH (US)

( * ) Notice: Subject to any disclaimer, the term of this patent is extended or adjusted under 35 U.S.C. 154(b) by 78 days.

(21) Appl. No.: 11/040,669

(22) Filed: Jan. 21, 2005

(65) Prior Publication Data

US 2006/0165153 A1 Jul. 27, 2006

(51) Int. Cl.
*G01K 1/14* (2006.01)
*G01K 13/00* (2006.01)
*G01K 7/02* (2006.01)

(52) U.S. Cl. ................ 374/152; 374/208; 374/179
(58) Field of Classification Search ................ 374/152
See application file for complete search history.

(56) References Cited

U.S. PATENT DOCUMENTS

| | | | | |
|---|---|---|---|---|
| 2,484,585 A | * | 10/1949 | Quinn | ................ 338/25 |
| 4,164,433 A | * | 8/1979 | Granahan et al. | ............ 136/229 |
| 4,265,117 A | * | 5/1981 | Thoma et al. | ............... 136/221 |
| 4,444,990 A | * | 4/1984 | Villar | .......................... 136/221 |
| 4,549,162 A | * | 10/1985 | Grimm | ......................... 338/28 |
| 4,653,827 A | | 3/1987 | Pappas | |
| 5,176,451 A | * | 1/1993 | Sasada et al. | ............... 374/179 |
| 6,204,915 B1 | | 3/2001 | Persegol et al. | |
| 6,466,424 B1 | | 10/2002 | Larranaga et al. | |

FOREIGN PATENT DOCUMENTS

EP 0 940 662 A1 9/1999

* cited by examiner

*Primary Examiner*—Diego Gutierrez
*Assistant Examiner*—Mirellys Jagan
(74) *Attorney, Agent, or Firm*—Martin J. Moran

(57) ABSTRACT

Hot spots in power conductors are monitored by apparatus comprising a temperature probe embedded in an electrically insulative thermally conductive material in surface-to-surface contact with the power conductor, typically at a joint being monitored. The temperature probe is spaced from the power conductor by the electrically insulative thermally conductive material a distance sufficient to provide electrical isolation, while the material has sufficient thermal conductivity that the temperature probe is able to substantiate trends in temperature changes at the joint. The invention can be incorporated into existing electrically insulative supports for the power conductors.

11 Claims, 3 Drawing Sheets

APPARATUS AND METHOD FOR DETECTING HOT SPOTS IN AN ELECTRIC POWER CONDUCTOR

BACKGROUND OF THE INVENTION

1. Field of the Invention

This invention relates to on-line detection of hot spots in electric power conductors.

2. Background Information

A potential problem in electric power equipment, such as, for example, switchgear and starters for large motors, is the occurrence of hot spots in the power conductors within enclosures that can lead to failures. Such hot spots occur at bolted joints in the power conductors and at terminals and are often attributable to poor workmanship or vibrations that over time result in loosening of the joints.

The possibility of such hot spots has induced many operators to resort to periodic inspections. The known state of the art in hot spot detection in electrical equipment is through infrared (IR) scanning. This requires removal of barriers and covers. The practice is expensive, time consuming, hit or miss, and is discrete and not continuous. In many cases, it requires temporary outages for removal of isolation barriers that obstruct IR scanning range. This practice exposes the operator to high voltages when safety barriers are removed on energized equipment. In some cases, many parts that have a potential of failing are not optically accessible while the equipment is energized. As IR scanning must be performed while the system is energized, the inspector must wear special clothing to protect against possible flashover. As an alternative to IR scanning, the system can be deenergized and checked for loose joints, which results in loss of equipment use, and again typically requiring the removal of barriers and covers, and the associated risk that they may not be properly replaced or may not be replaced at all.

There is a need, therefore, for improved apparatus and methods of checking for hot spots in electric power equipment, and preferably for on-line techniques that provide real time continuous monitoring for hot spots.

SUMMARY OF THE INVENTION

In accordance with the invention, the power conductors in electrical equipment are continuously monitored for hot spots by the use of temperature sensors that are applied directly in physical contact with the conductors. In accordance with aspects of the invention, the temperature sensors comprise an electrically insulative support member having a contact surface for engaging the power conductor with a cavity. Electrically insulative thermally conductive material in the cavity extends to the contact surface to bring the material into surface-to-surface contact with the power conductor. A temperature probe is embedded in the electrically insulative thermally conductive material spaced by the electrically insulative thermally conductive material from the power conductor sufficiently to be electrically isolated. The electrically insulative thermally conductive material has sufficient thermal conductivity to heat the temperature probe to within a specified tolerance of the temperature of the power conductor. The temperature probe can be for instance a resistance temperature detector or a thermocouple. In accordance with certain aspects of the invention, the temperature probe could be spaced from the power conductor by a sufficient portion of the electrically insulative thermally conductive material to provide a basic impulse level of at least about 60 kV. Other suitable spacings for the temperature probe may be acceptable at various corresponding basic impulse levels.

In accordance with additional aspects of the invention, the electrically insulative support member can have at least one fastener member embedded in the contact surface and can be a support for the power conductor. When a pair of power conductors form a joint, the support member can have at least two fastener members for securing the joint. In accordance with additional aspects, the support member can have a base section containing the cavity and a sleeve through which electrical leads for the temperature probe extend. If the supporting material possesses adequate thermal conductivity, then the temperature probe may be molded directly into the body of the support at the time of its manufacture.

Aspects of the invention can also be applied to electric power equipment having multiple phase conductors in which case electrically insulative thermally conductive material is placed in surface-to-surface contact with each of the phase conductors. A temperature probe encapsulated in the electrically insulative thermally conductive material generates a sensor signal for each phase conductor. In this embodiment, a controller receives the sensor signals generated by each temperature probe and generates an alarm in response to selected temperature criteria. For instance, the controller can generate an alarm when any of the sensor signals exceeds a selected threshold. Alternatively, the controller can generate an alarm when there is an imbalance in the sensor signals monitoring the temperature of the power conductors.

The invention also embraces a method of detecting hot spots in a conductor of electric power equipment that comprises: forming a cavity adjacent to the power conductor, inserting a temperature probe into the cavity, filling the cavity and encapsulating the temperature probe with an electrically insulative thermally conductive material, and curing the electrically insulative thermally conductive material while in surface-to-surface contact with the power conductor. The temperature probe is spaced from the power conductor sufficiently to electrically isolate the temperature probe from the power conductor and the electrically insulative thermally conductive material has sufficient thermal conductivity to heat the temperature probe to within a specified tolerance of the temperature of the power conductor. In accordance with an aspect of the invention, the cavity can be formed in an electrically and thermally insulative material that remains in place after curing. In an embodiment of the invention, the temperature probe is spaced at least about one inch (25.4 mm) from the power conductor and the electrically insulative thermally conductive material can be a material, such as an adhesive, having a coefficient of thermal conductivity of at least about 1 watt per meter Kelvin.

The invention also embraces a method of on-line monitoring of hot spots in power equipment having a power conductor housed in an electrical enclosure that comprises: placing in surface-to-surface contact with the power conductor within the electrical enclosure an electrically insulative thermally conductive material in which is encapsulated a temperature probe that provides a sensor signal indicative of temperature and that is spaced from the power conductor sufficiently to be electrically isolated therefrom. The method further includes monitoring the sensor signal and generating an alarm in response to selected temperature characteristics of the power conductor indicated by the sensor signal. The selected temperature characteristics can be a temperature of the power conductor above a selected level. It can also be a function of time and current carried by the conductor. In accordance with another aspect of the invention, the selected characteristic can be a selected increase in temperature over a selected time interval. Where the power equipment is multi-phase having a plurality of phase conductors within the enclosure, an electrically insulative thermally conductive material in which is encapsulated a temperature probe is placed in surface-to-surface contact with each of the plurality of phase conductors and an alarm is generated when the sensor signals indicate an imbalance in temperature in the plurality of phase conductors. A single sensor may be positioned in appropriate proximity to provide temperature indication of multiple conductors, which has the benefit of reducing the total number of sensors required in a system.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention is directed to monitors for detecting hot spots in electric power systems. It will be described as applied to medium-voltage electric power systems; however, it will be evident that it also has application to other power systems such as, for example, low-voltage power distribution systems.

Figure 1:
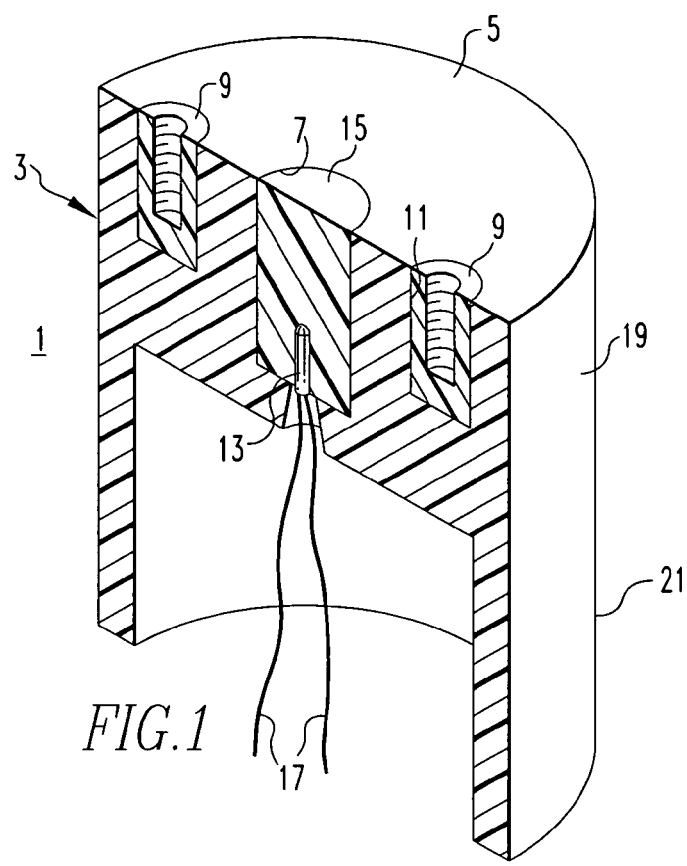
FIG. 1 is an isometric view of a hot spot detector in accordance with aspects of the invention.
Figure 2:
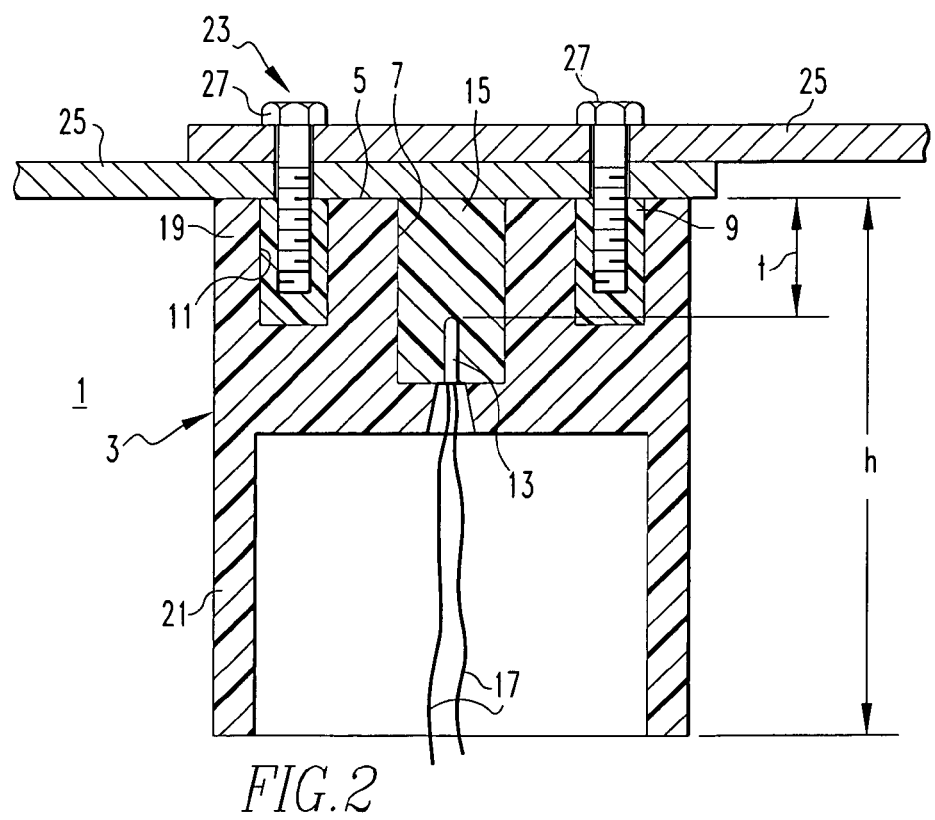
FIG. 2 is a vertical cross section through the hot spot detector of FIG. 1 shown mounted to monitor for hot spots at a lap joint between conductors of an electric power system.

Turning to FIGS. 1 and 2, one embodiment of a monitor 1 for detecting hot spots in electric power conductors includes an electrically and thermally insulative support member 3 that in this particular embodiment is cylindrical. An end contact surface 5 has a cavity 7 that, again in the exemplary embodiment, can be cylindrical. A pair of fastener members 9, which in the exemplary embodiment are threaded inserts, are seated in bores 11 in the contact surface 5. Other types of fastener members 9 could be used, such as studs, which would project above the contact surface 5. A temperature probe 13, such as a resistance temperature detector (RTD) or a thermocouple, is embedded in an electrically insulative thermally conductive material 15 that fills the cavity 7 so that it is flush with the contact surface 5. The temperature probe has a pair of electrical leads 17 that are directed out of the support member 3 so that they are spaced from the contact surface 5. In the embodiment of FIGS. 1 and 2, the support member 3 has a base section 19 and an extension or sleeve 21 through which the electrical leads 17 extend.

FIG. 2 illustrates a lap joint 23 between a pair of conductors 25 in the form of flat bus bars. The lap joint 23 is secured by bolts 27 that would typically be engaged by nuts (not shown) or would engage threaded inserts in a bus support. In accordance with the invention, the support member 3 replaces such nuts or is incorporated into the bus support and also facilitates monitoring the lap joint 23 for hot spots. As shown, the bolts 27 engage the threaded inserts 9 in the monitor 1 to complete the lap joint and to press the electrically insulative thermally conductive material 15 into surface-to-surface contact with the underside of the lower power conductor 25.

The temperature probe 13 is embedded in the electrically insulative thermally conductive material 15 and spaced by a distance, t, from the surface-to-surface contact with the conductor 25 sufficient that the temperature probe 13 is electrically isolated from the conductor 25. At the same time, the electrically insulative thermally conductive material 15 has a thermal conductivity sufficient to heat the temperature probe 13 sufficiently to substantiate trends in temperature change in the power conductor 25. In this regard, it is preferred that the electrically insulative thermally conductive material 15 has a thermal conductivity of at least about 1 Watt/m Kelvin. In this manner then, the temperature probe 13 is capable of detecting hot spots in the conductor such as would occur at the lap joint 23. The sleeve 21 has a length sufficient to provide the electrical leads 17 for the temperature probe 13 with a standoff distance (h) sufficient to protect the leads from flashover from the conductors 25.

EXAMPLE

Tests were conducted with a resistance temperature detector as the temperature probe 13 available from Omega Engineering, Inc. identified as part number 1PT100GX1013 having a diameter of 1.3 mm and a length of 10 mm. The electrically insulative thermally conductive material 15 was a thermally conductive adhesive manufactured by Dow Corning Corporation identified by their number 3-6751. This is a two part adhesive with a thermal conductivity of 1.1 watts/m Kelvin. Dow Corning product 3-6752, a one part adhesive, had a better thermal conductivity of 1.7 watts/m Kelvin but this product is more viscous and more difficult to work with. The diameter of the cavity 7 was ½ inch (12.7 mm) and the tip of the temperature probe 13 was one inch (25.4 mm) from the contact surface of the electrically insulated thermally conductive material 15. The standoff height (h) was three inches (76.2 mm). The temperature probe method indicated a temperature within approximately 5% of the actual bus temperature with a rate of change of 15 degrees Kelvin or less per hour. The rate of change is typically below 15 degrees Kelvin with the exception of initial start up of equipment. The support member 3 was a glass polyester resin. When used with medium voltage equipment such as medium voltage starters, the standoff distance (h) should meet the Underwriters Laboratory Standard UL347 of 60 kV (Basic Impulse Level) for high voltage industrial control equipment.

Figure 3:
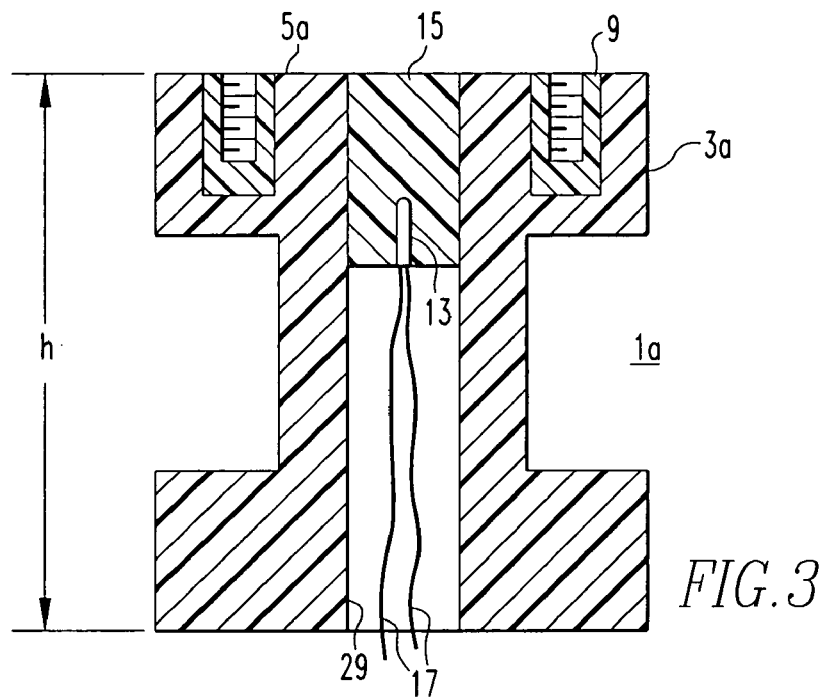
FIG. 3 is a vertical cross section through a bus bar support adapted to incorporate aspects of the invention.

As shown in FIG. 3, the invention can be applied to a conventional support member 3a commonly used to support bus bars in medium voltage applications to provide the monitor 1a. In this case, a hole 29 is bored through the insulative support member 3a. The temperature probe 13 can be positioned within this bore 29 at the proper distance from the upper contact surface 5a and held in place while the electrically insulative thermally conductive material 15 is injected into the bore 29. When the electrically insulative thermally conductive material 15 cures, the support member 3a can be used to simultaneously support power conductors and monitor for hot spots. The height, h, of the support member 3a provides the appropriate standoff distance for the probe electrical leads 17. The inventory of support members 3a can be modified as shown in FIG. 3 or the modification can be done in situ for an existing installation.

Figure 4:
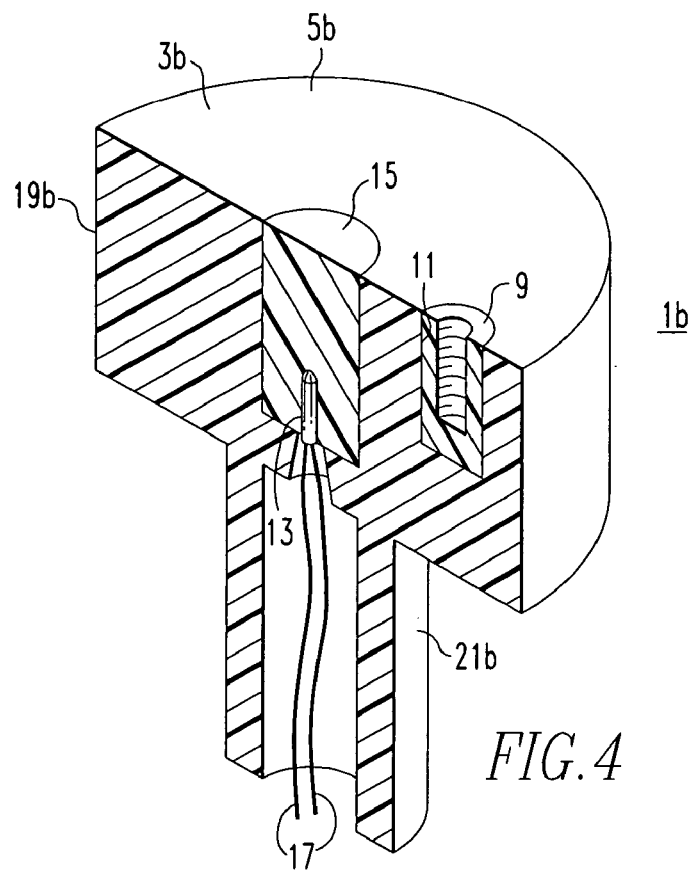
FIG. 4 is an isometric view of another embodiment of the invention which may be used to monitor hot spots at terminals in an electric power distribution system.
Figure 5:
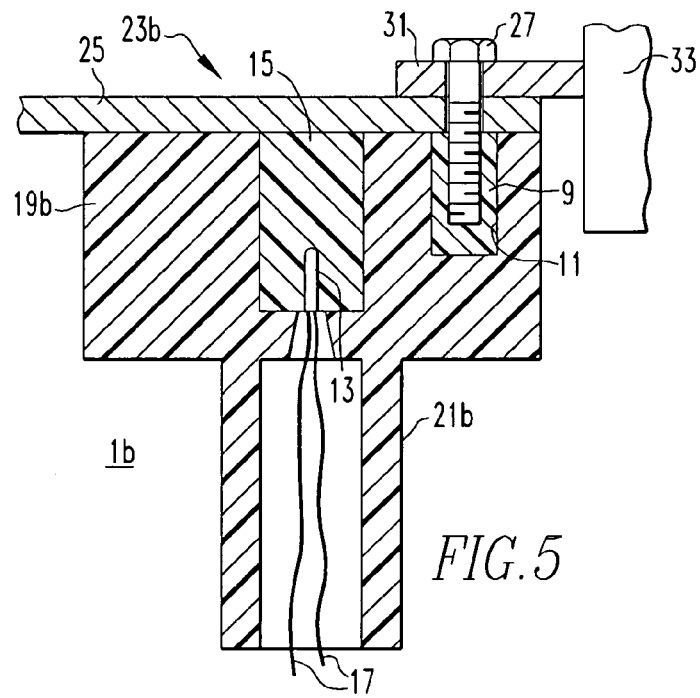
FIG. 5 is a vertical cross section through the hot spot monitor of FIG. 4 shown in place for detecting hot spots in an electric power conductor at a terminal in an electric power distribution system.

Another embodiment of the monitor 1b in accordance with aspects of the invention is shown in FIGS. 4 and 5. As illustrated there, the support member 3b has only a single fastener member 9 in the form of a threaded insert embedded in the contact surface 5b. In addition, the sleeve 21b can be of reduced diameter from the diameter of the base section 19b. Such a monitor 1b is suitable, for instance, for use with a terminal conductor 31 for a piece of power equipment 33. The single threaded insert 9 receives a single bolt 27 that secures the terminal conductor 31 to a power conductor 25 while also positioning the temperature probe 13 for monitoring hot spots at the joint 23b between a terminal conductor 31 and the power conductor 25.

Figure 6:
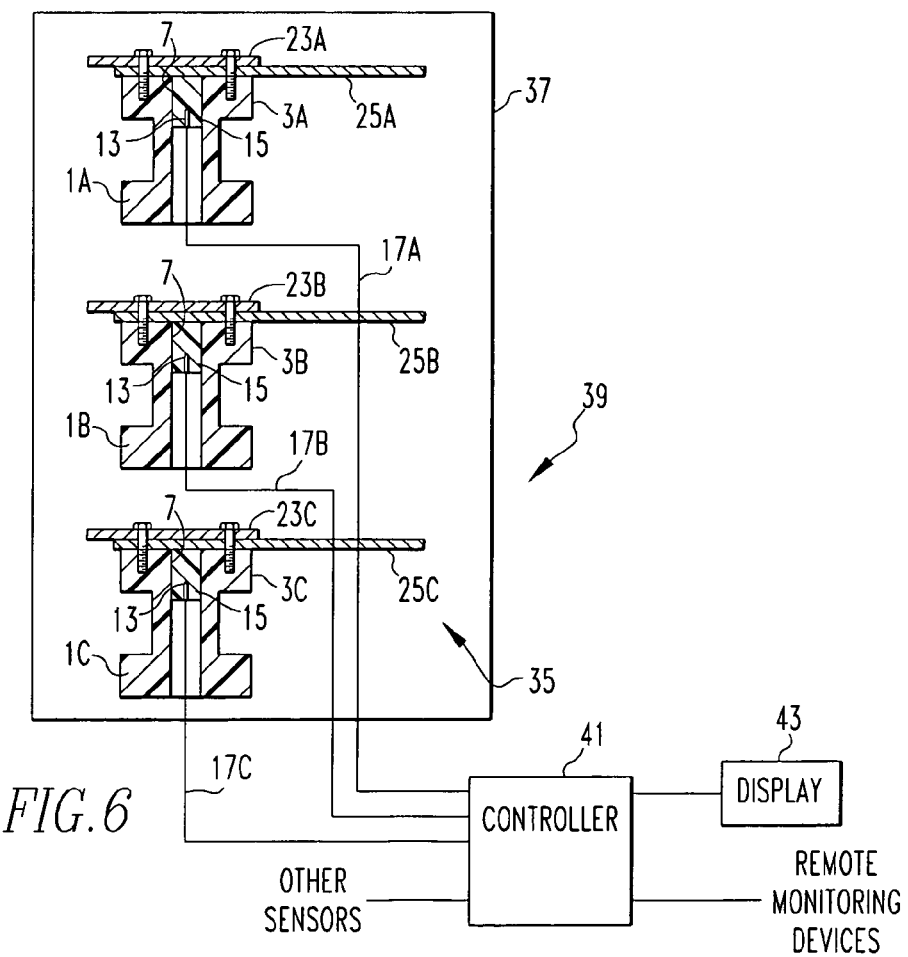
FIG. 6 is a schematic view showing aspects of the invention applied to three-phase equipment in an electric power system.

FIG. 6 illustrates application of the invention to a three phase electric power system 35 having the three phase conductors 25A, 25B and 25C housed within a metal enclosure 37. The monitoring system 39 includes the three monitors 1A, 1B and 1C having electrically insulative support members 3A, 3B and 3C bolted to joints 23A, 23B and 23C in the respective phase conductors. The leads 17A, 17B and 17C for each of the monitors provide sensor signals to a controller 41. The controller 41 analyzes the sensor signals for temperature/time characteristics indicative of a hot spot. For instance, the controller 41 can alarm on any one of the sensor signals indicating a temperature above a threshold value, or a designated change in temperature. As another example, the controller 41 could alarm on an imbalance of a selected level between the signals from the respective phase monitors. The monitor system 39 can include a local display 43 for providing a man-machine interface. Additionally, or in place of this display 43, the controller 39 can provide readouts and alarms to remote monitoring devices. In addition, the controller can simultaneously monitor signals from multiple additional sensors.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. Apparatus for detecting hot spots in a power conductor in an electric power system, the apparatus comprising:
   an electrically insulative support member having a contact surface for engaging the power conductor and a cavity in the contact surface;
   an electrically insulative thermally conductive material in the cavity extending to the contact surface to bring the electrically insulative thermally conductive material into surface-to-surface contact with the power conductor; and
   a temperature probe embedded in the electrically insulative thermally conductive material spaced from the power conductor sufficiently to be electrically isolated from the power conductor, the electrically insulative thermally conductive material having sufficient thermal conductivity to heat the temperature probe sufficiently to substantiate trends in temperature change in the power conductor.

2. The apparatus of claim 1 wherein the temperature probe comprises a thermocouple.

3. The apparatus of claim 1 wherein the temperature probe is spaced from the power conductor at least about one inch.

4. The apparatus of claim 1 wherein the temperature probe has electrical leads adapted for external electrical connection and the electrically insulative support member comprises a base section containing the cavity and a sleeve through which the electrical leads extend.

5. Apparatus for detecting hot spots in a power conductor in an electric power system, the apparatus comprising:
   an electrically insulative support member having a contact surface for engaging the power conductor and a cavity in the contact surface;
   an electrically insulative thermally conductive material in the cavity extending to the contact surface to bring the electrically insulative thermally conductive material into surface-to-surface contact with the power conductor; and
   a temperature probe embedded in the electrically insulative thermally conductive material spaced from the power conductor sufficiently to be electrically isolated from the power conductor, the electrically insulative thermally conductive material having sufficient thermal conductivity to heat the temperature probe sufficiently to substantiate trends in temperature change in the power conductor,
   wherein the electrically insulative support member has at least one fastener member embedded in the contact surface.

6. The apparatus of claim 5 wherein the electrically insulative support member is a support for the power conductor.

7. The apparatus of claim 6 wherein the power conductor comprises a pair of power conductors forming a joint and the electrically insulative support member has at least two fastener members for securing the joint and positioning the temperature probe to substantiate the trends in temperature change at the joint.

8. Apparatus for detecting hot spots in a power conductor in an electric power system, the apparatus comprising:
   an electrically insulative support member having a contact surface for engaging the power conductor and a cavity in the contact surface;
   an electrically insulative thermally conductive material in the cavity extending to the contact surface to bring the electrically insulative thermally conductive material into surface-to-surface contact with the power conductor; and
   a temperature probe embedded in the electrically insulative thermally conductive material spaced from the power conductor sufficiently to be electrically isolated from the power conductor, the electrically insulative thermally conductive material having sufficient thermal conductivity to heat the temperature probe sufficiently to substantiate trends in temperature change in the power conductor,
   wherein the temperature probe is spaced from the power conductor by a sufficient portion of the electrically insulative thermally conductive material to provide a basic impulse level of at least about 60 kV.

9. Apparatus for detecting hot spots in a conductor in an electric power system having multiple phase conductors, the apparatus comprising:

an electrically insulative support member associated with each phase conductor and each having a cavity filled with an electrically insulative thermally conductive material in surface-to-surface contact with the associated phase conductor;

a temperature probe in each cavity embedded in the electrically insulative thermally conductive material and generating a sensor signal and spaced from the associated power conductor to be electrically isolated therefrom; and a controller receiving the sensor signal generated by each temperature probe and generating an alarm in response to selected temperature criteria.

10. The apparatus of claim 9 wherein said controller generates an alarm when any of the sensor signals exceeds a selected threshold.

11. The apparatus of claim 9 wherein said controller generates an alarm when there is an imbalance in the sensor signals.

* * * * *